United States Patent

Murray (10) Patent No.: US 9,881,180 B2
(45) Date of Patent: *Jan. 30, 2018

(54) RANDOMIZED INPUT DEVICE HEATING (71) Applicant: International Business Machines Corporation, Armonk, NY (US)

(72) Inventor: Brendan Murray, Monasterboice (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,725

(22) Filed: Oct. 19, 2016

(65) Prior Publication Data
US 2017/0061158 A1    Mar. 2, 2017

Related U.S. Application Data (63) Continuation of application No. 14/974,688, filed on Dec. 18, 2015, now Pat. No. 9,519,296, which is a
(Continued)

(51) Int. Cl.
*G06F 21/62* (2013.01)
*G05D 23/19* (2006.01)
(Continued)

(52) U.S. Cl.
CPC ......... *G06F 21/6254* (2013.01); *G05B 15/02* (2013.01); *G05D 23/1917* (2013.01);
(Continued)

(58) Field of Classification Search
CPC .. G06F 21/6254; G06F 21/6209; G06Q 20/40
(Continued)

(56) References Cited

U.S. PATENT DOCUMENTS 5,613,007 A * 3/1997 Balga, Jr. ........... G07B 17/0008
380/51
6,054,940 A    4/2000 Greene
(Continued)

FOREIGN PATENT DOCUMENTS

WO    2013064137 A1    5/2013

OTHER PUBLICATIONS

Mowery et al., "Heat of the Moment: Characterizing the Efficacy of Thermal Camera-Based Attacks," Proceedings of WOOT 2011, Aug. 2011, pp. 1-8. https://cseweb.ucsd.edu/~kmowery/papers/thermal.pdf.
(Continued)

*Primary Examiner* — Samuel M Heinrich
(74) *Attorney, Agent, or Firm* — Nathan M. Rau (57) ABSTRACT

A security code input may be obfuscated from a thermal imaging device by randomly heating a random set of inputs of an input device. The security code is inputted on an input device, which communicates with a security system to grant or deny access to a user based on an entry of the security code. The input device includes a plurality of hearing elements. The input device may receive an input from the user. A random set of heating elements including one or more heating elements, are generated from the plurality of heating elements. A temperature is determined for the one or more heating elements of the random set of heating elements. The temperature is then applied to the one or more heating elements of the random set of heating elements of the input device.

1 Claim, 6 Drawing Sheets

Related U.S. Application Data continuation of application No. 14/835,885, filed on Aug. 26, 2015.

(51) Int. Cl.

| | | |
|---|---|---|
| *G05B 15/02* | (2006.01) | |
| *H04L 9/32* | (2006.01) | |
| *G06Q 20/40* | (2012.01) | |
| *G06F 21/83* | (2013.01) | |
| *H05B 1/02* | (2006.01) | |

(52) U.S. Cl.
CPC .......... *G06F 21/6209* (2013.01); *G06F 21/83* (2013.01); *G06Q 20/40* (2013.01); *G06Q 20/4018* (2013.01); *H04L 9/32* (2013.01); *H05B 1/0227* (2013.01); *G06F 2221/2113* (2013.01)

(58) Field of Classification Search
USPC .............................. 380/51, 24, 287; 726/26
See application file for complete search history.

(56) References Cited

U.S. PATENT DOCUMENTS

| | | |
|---|---|---|
| 6,307,956 B1 | 10/2001 | Black |
| 7,477,740 B2 | 1/2009 | Bennett |
| 8,198,568 B2 | 6/2012 | Klinghult |
| 8,750,705 B2 | 6/2014 | Dickson et al. |
| 9,165,216 B2 | 10/2015 | Angell et al. |
| 9,721,111 B2 * | 8/2017 | Cavanaugh ............. G06F 21/62 |
| 2001/0049785 A1 | 12/2001 | Kawan et al. |
| 2016/0291614 A1 | 10/2016 | Sioquim et al. |

OTHER PUBLICATIONS

Nicander Mohr, C., "The New Way Thieves Can Steal Your PIN Code and the Easy Way to Thwart Them!" The Wonder of Tech, Sep. 1, 2014, pp. 1-11, printed May 22, 2015. http://www.wonderoftech.com/pin-code-theft/.

Owano, N., "PIN customers can avoid heat of thiefs phone attachment," PhysOrg, techxplore.com, Sep. 1, 2014, pp. 1-2, retrieved May 7, 2015, printed May 22, 2015, © 2014 Tech Xplore. http://phys.org/news/2014-09-pin-customers-thief.html.

Ross et al., "Tech Hack | How to fool thermal imaging thieves," 11 Alive News Atlanta, May 4, 2015, 3 pages, printed: May 22, 2015. http://www.11alive.com/story/news/crime/2015/04/29/tech-hack--how-to-fool-thermal-imaging-thieves/26524913/.

Murray, B., "Randomized Input Device Heating," U.S. Appl. No. 14/835,885, filed Aug. 26, 2015.

Murray, B., "Randomized Input Device Heating," U.S. Appl. No. 14/974,688, filed Dec. 18, 2015.

Accelerated Examination Support Document dated Dec. 16, 2015 for U.S. Appl. No. 14/974,688, 9 pages.

Murray, B., "Randomized Input Device Heating," U.S. Appl. No. 15/297,692, filed Oct. 19, 2016.

Accelerated Examination Support Document dated Oct. 14, 2016 for U.S. Appl. No. 15/297,692, 10 pages.

List of IBM Patents or Patent Applications Treated as Related, signed Aug. 15, 2017, 2 pages.

\* cited by examiner

RANDOMIZED INPUT DEVICE HEATING

BACKGROUND

The present disclosure relates to information security, and more particular aspects relate to access control and authorization.

Security systems may be used to gain access to secured locations or protect secured items. The security system may require a security code that authorizes or denies a user access based on if they know the security code or not. A security device may be used to input the security code. The user may input the security code on the security device to gain access to the secured location or secured items.

SUMMARY

According to embodiments of the present disclosure, a method, a system, and a computer program product are proposed to use random interjections of heat on a device or sound through a speaker to obfuscate a security code of a user. Obfuscating the security code may include making it difficult for an unauthorized user to copy and later using a security code of an authorized user. The usage of an authorized user's security code may be obfuscated by randomly heating the input device to create thermal noise and obfuscate thermal imaging security breaches. The usage of an authorized user's security code may be obfuscated by generating a random audible tone to create audible noise and obfuscate auditory security breaches.

One embodiment provides a method for obfuscating a security code from a thermal imaging device by randomly heating a random set of inputs of an input device. A security code input may be obfuscated from a thermal imaging device by randomly heating a random set of inputs of an input device. An ambient temperature may be measured of the input device. The security code is inputted on an input device, which communicates with a security system to grant or deny access to a user based on an entry of the security code. The input device includes a plurality of hearing elements. The input device may receive an input from the user. A random audible tone may be communicated to the user. The temperature of the input of the user on the input device is recorded. A random set of heating elements including one or more heating elements, are generated from the plurality of heating elements. Based on the temperature of the input of the user a temperature is determined between an upper threshold and a lower threshold of the temperature. A temperature is determined for the one or more heating elements of the random set of heating elements. The temperature is then applied to the one or more heating elements of the random set of heating elements of the input device.

Another embodiment is directed towards a system for obfuscating a security code from a thermal imaging device by randomly heating a random set of inputs of an input device. The system includes a memory, a processor device, an input device, and a heating controller. The processor device communicatively couples the memory, the input device, and the heating controller. The input device is configured to communicate a security code to a security system, which may grant or deny access to a user based on an entry of the security code. The input device includes a plurality of hearing elements. The input device is configured to receive an input from the user. The processor device is configured to generate a random set of heating elements including one or more heating elements, from the plurality of heating elements. The processor device is configured to determine a temperature for the one or more heating elements of the random set of heating elements. The heating controller is configured to apply the temperature to the one or more heating elements of the random set of heating elements of the input device.

Yet another embodiment is directed toward a computer program product for obfuscating a security code from a thermal imaging device by randomly heating a random set of inputs of an input device. The computer program product is configured to communicate a security code to a security system, which may grant or deny access to a user based on an entry of the security code. The input device includes a plurality of hearing elements. The heating elements of the input device are coupled with a heating controller. The computer program product is configured to receive an input from the user. The computer program product is configured to generate a random set of heating elements including one or more heating elements, from the plurality of heating elements. The computer program product is configured to determine a temperature for the one or more heating elements of the random set of heating elements. The computer program product is configured to apply the temperature to the one or more heating elements of the random set of heating elements of the input device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to deterring an unauthorized user from effectively monitoring a usage of a security code or information of a user, more particular aspects relate using thermal or audible noise to obfuscate a theft of a security code of a user. The security code of the user can be used to gain access to information, a location, or tangible goods in the possession of the user. To obfuscate the unauthorized user from monitoring the usage of the security key, noise that may be thermal or audible may be used to make it difficult for the unauthorized user to gather the security code of the user. While the present disclosure is not necessarily limited to such applications, various aspects of the disclosure may be appreciated through a discussion of various examples using this context.

With the increase in quality of thermal imaging, new and inexpensive thermal imaging devices may be readily available for use by consumers. The thermal imaging devices may be compact or easily concealable and that may allow users to operate the thermal imaging devices without being noticed. The increases in quality of thermal imaging devices allow the devices to display minor temperature differences, which may be used to determine transfers of heat from people to objects. The thermal imaging device may be used to monitor an object before interaction for a base temperature, and after interaction to determine a change in temperature being an interaction with the object. A base temperature may be the ambient temperature of the object before interaction. The change in temperature may be the residual heat left by the user after interaction. To obfuscate thermal imaging attacks, the input device may be heated in random locations to produce a variable heat map to make thermal imaging difficult for unauthorized users, described further herein.

Passcodes or personal identification numbers (PINs) may be used to protect an identity of a user, The PINs can be used to log in to secure systems or gain entry to a secured area. These PINs may be observed and later used by an unauthorized person to gain access to locations or items that do not belong to them. To obfuscate an unauthorized person from gaining access, active measures may be used to thwart security threats.

An input device used to enter a security code may include a grouping of one or more distinct inputs. The grouping of distinct inputs may include visual, tactile, or audial properties that may distinguish a first input from a second input. The input device may be made out of various materials including but not limited to metal, plastic, or glass. An example list of input devices may include a number pad, a keyboard, or a screen displaying a grouping of inputs. For example, the distinct inputs may be inputs or buttons that a user may press to input the security code. The buttons or inputs may be individually marked such that a first input may be distinguished from a second input. For example, the marking could include a first input with a visual marking of a number 1 and a second input with a visual marking of a number 2. In an additional example, the marking could include tactile reading system or marking such as braille of a first input with a tactile marking of a number 1, and a second input with a tactile marking of a number 2. In an additional example, a screen displaying a grouping of inputs facilitated by a graphical user interface (GUI). The touch screen may display numbers, letters, pictures, or a combination thereof. The inputs of the touch screen may be displayed on a portion of the screen where a first input may require a first portion of the screen, and a second input may require a second portion of the screen. The portion of the screen may include a preselected selection of the screen that the user may use to input on the touch screen. For example, a portion of the screen may be divided into 1 inch by 1 inch square that the user may touch to input the security code.

A security device may be an input device that a user may input a code into to gain access to or lock/unlock an item or a location. For example, an input device may be a number keypad including the numbers 0-9 arranged such that the user may input a combination of the numbers 0-9 to create a security code. In an additional example, an input device may be a keyboard input device that may include the alphabet and the numbers 0-9 that the user may input into a combination to create a security code. The input device may also be displayed on a screen. For example, a screen displaying a grouping of inputs may include a GUI, which may display numbers, letters, pictures, or a combination thereof. The inputs of the GUI may be combined to create a security code.

Heat transfer to the security device may happen in one or more ways. Types of heat transfer may include conduction, convection, and radiation. Conductive heat transfer may include heat flowing through two solid objects where the heat from one object moves to another. For example, the heat transfer of conduction may include a user pressing an input of an input device. The heat of the user's finger may transfer to the input heating the input through conduction. In an additional example, conduction may include placing a heating element in contact with an input and heating the input. The emitted heat from the heating element may be transferred to heat the colder input. Convective heat transfer includes heat flowing from a heat source through liquid or gas where the warm liquid or glass rises pushing cooler liquid or glass towards the heat source. For example, heat transfer of convection may include a heating element placed behind an input of the input device. The heating element may heat the air around the input through convection, which may transfer the heat to the input. Radiation heat transfer carries heat through empty space called infrared radiation, where a heat source heats an object through the space or air. For example, heat transfer of radiation may include a heat source placed behind an input of the input device and the heat may radiate from the heating element heating the input.

Thermal imaging devices may be used by an unauthorized user to gather inputs, which may be combined into a security code (code). The security code may be used to access restricted information or items owned by an authorized user. Thermal imaging devices may include stand-alone devices and extensions that may be attached to devices (e.g. mobile phone extensions). The thermal imaging device may create a thermal image (heat map). The heat map may show the inputs of the user if the pressing of the inputs of the security device transfers heat from the user to the inputs. An unauthorized user may then use the heat map to determine the security code of an authorized user. For example, a security code may be used to gain access to a building. To access the building a user must input a PIN to unlock the doors and enter the building. An unauthorized user may use a thermal imaging device to view the security code of a user after the user has entered the security code. The unauthorized user may copy the security code of the authorized user to enter the building.

In some scenarios, the security inputs may require multiple forms of identification. For example, an authorized user may have to input security checks to access their baking account from an automated teller machine (ATM). The ATM may require two security checks. The first security check may require the user to provide a physical identification of owning the bank account (e.g. a checking card). The second security check may require a security code (e.g. a PIN). The user must input both security checks to gain access to the bank account. For an unauthorized user to gain access to the bank account of the user, the unauthorized user must gain access or steal the physical identification, and the security code to access the bank account of the user. To steal the physical identification the unauthorized user may take the physical identification from the user. To steal the security code the unauthorized user may use thermal imaging device to gather the PIN of the bank account of the user. The unauthorized user may use the physical identification and the security code to gain access to the bank account of the user.

The creation of incorrect inputs (i.e. noise) may be used to cause a disruption of the ability of an unauthorized user to gather the inputs of the user. Noise may include creating an illusion of additional inputs that the user did not make to create incorrect inputs. If a first button press of a user may cause a random set of inputs to seem as they also have been pressed, then the random set of inputs may be considered noise. For example, a 10 digit input device may be used to input a security code. If a user inputs a first input that causes a random set of inputs to be heated, then the noise may cause an incorrect heat map to be generated from a thermal imaging device that is being operated by the unauthorized user.

To obfuscate unauthorized users from accessing a security input of an authorized user obfuscation methods may be put into place. Obfuscation methods may include the interjections of noise to obfuscate an attempt of an unauthorized user from gaining access to the security code. Noise may include heating the locations of inputs (i.e. inputs) of the input device to make thermal imaging difficult. The heating of the locations of the inputs may include placing a heating element behind, or within the inputs of the input device. For example, the input device may be a 10 digit input device. Behind the inputs of the 10 digit input device, heating elements may be placed that may randomly heat the inputs such that the use of a thermal imaging device may have troubles discerning the heat transferred inputting the security code and the random heating. In another example, the input device may be a glass screen displaying a grouping of inputs on a GUI. Behind the screen, but within the input device a heating controller may be placed. The heating controller may connect a grouping of a plurality heating elements, or a variable heating controller. The heating controller may apply a temperature to a random set of the heating elements. The plurality of heating elements may be heated randomly by the variable heating controller such that the use of a thermal heating imaging device may have troubles discerning the heat transferred inputting the security code and the random heating by the heating controller.

By randomly selecting a set of heating elements and heating the randomly selected set, the security code may be difficult to determine from the thermal noise that was generated. An unauthorized user operates a thermal imaging device to gather a heat map of the input device. If the input device does not include heating elements that are randomly selected, then the heat of the security code input of the user may be absorbed by the inputs of the input device. An unauthorized user may then analyze the heat map generated by the thermal imaging device and copy the security code of the authorized user. If a background temperature or ambient temperature of the input device is present, then the input of the user may increase the temperature of the input over the background temperature by pressing the inputs. For example, if the temperature of the input device is 35° C. and an input of the authorized user raises the temperature of the input to 37° C., then the input of the user may be observed on a heat map by the unauthorized user.

An additional obfuscation method for obfuscating an unauthorized user attempting to access a security input from an authorized user may include producing an auditory tone (i.e. sound) to disguise the sound of the input. When an input of a security device is pressed, a tone may be emitted to disguise the input from an unauthorized user from monitoring the sounds outputted from the pressing of the input. The tone may be the same tone for each pressing of the input, or the tone may be random for each pressing of an input. The tone may not be audible by unassisted human ears, but when amplified by an eavesdropping device the tone may mask the input of the user. For example, an input device may include a 10 digit input device. For each button press by a user, an audible beep may be outputted by the security device for each input from the user. In an additional example, a tone repository may be stored within the security device or a computer communicatively coupled to the security device. The tone repository may store a collection of tones that are randomly outputted by the security device for each input of the user.

Figure 1:
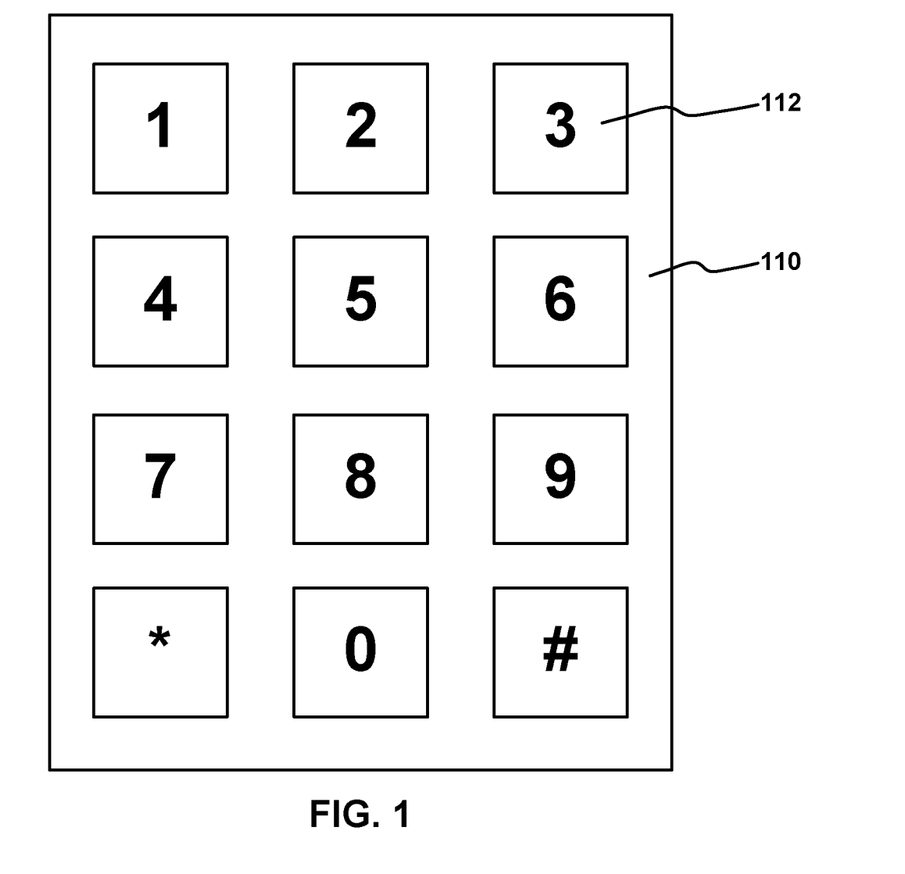
FIG. 1 depicts an illustration of a security device as an input device, according to various embodiments.

In FIG. 1, a security device is illustrated, according to embodiments. The security device illustrated may be an input device 110 including inputs 112. The input device 110 illustrated may be a 10 digit input device 110. The inputs 112 of the input device 110 are marked 0-9 and can be combined by using a plurality of inputs 112 to create a security code. To gain access a user may input the security code. For example, an input device 110 may be used to lock or unlock a door of a secured room of a building, a device of the user, or a safe. The input device 110 may authenticate the input of the security code of the user and allow or deny the user access to the secured room. If the user correctly inputs the security code, then the user may gain access to the secured room.

In various embodiments, the input device 110 may be a touchscreen. If the input device 110 is a touch screen, then the inputs 112 may be displayed on the screen through a GUI. For example, the touch screen may display the inputs 112 on the GUI to the user for inputting the security code. The security code may include alphanumeric characters, or images displayed on the touch screen facilitated by the GUI. In an additional example, the input device 110 may be a mobile device that may require a security code to access the phone. The mobile device may display the inputs 112 as alphanumeric characters, or images to the user to input the security code.

Figure 2:
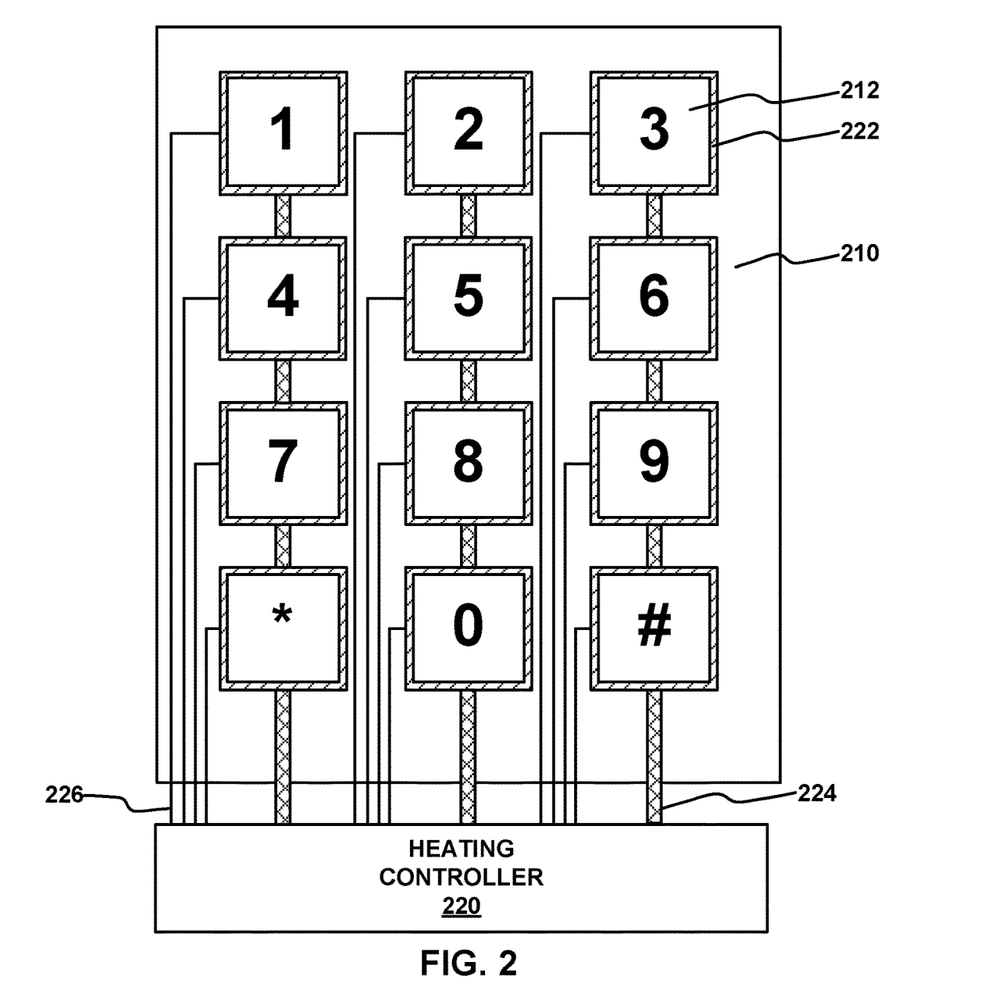
FIG. 2 depicts an illustration of an interconnect between the inputs of an input device and a heating controller, according to various embodiments.

FIG. 2, an interconnect between the inputs of an input device and a heating controller is illustrated, according to embodiments. A security device may contain a plurality of inputs 212 arranged on the input device 210. An interconnect 226 may connect the heating controller 220 to heating elements 222 and return to the heating controller through the neutral 224 that may connect to a ground. The heating elements 222 may be heated through electrical heating. Electrical heating may include any process where electrical energy is turned into heat. For example, electrical heating may include and electrical resistors, which may receive work in the form of electricity and output heat. The heating controller 220 may select a plurality of heating elements 222 to be heated upon an input from a user. For example, an input from a user may include an input. The input may include the user pressing an input 212 of the input device 210. If the user presses an input 212, then the heating controller 220 may heat one or more heating elements 222 of the input device 210.

Figure 3:
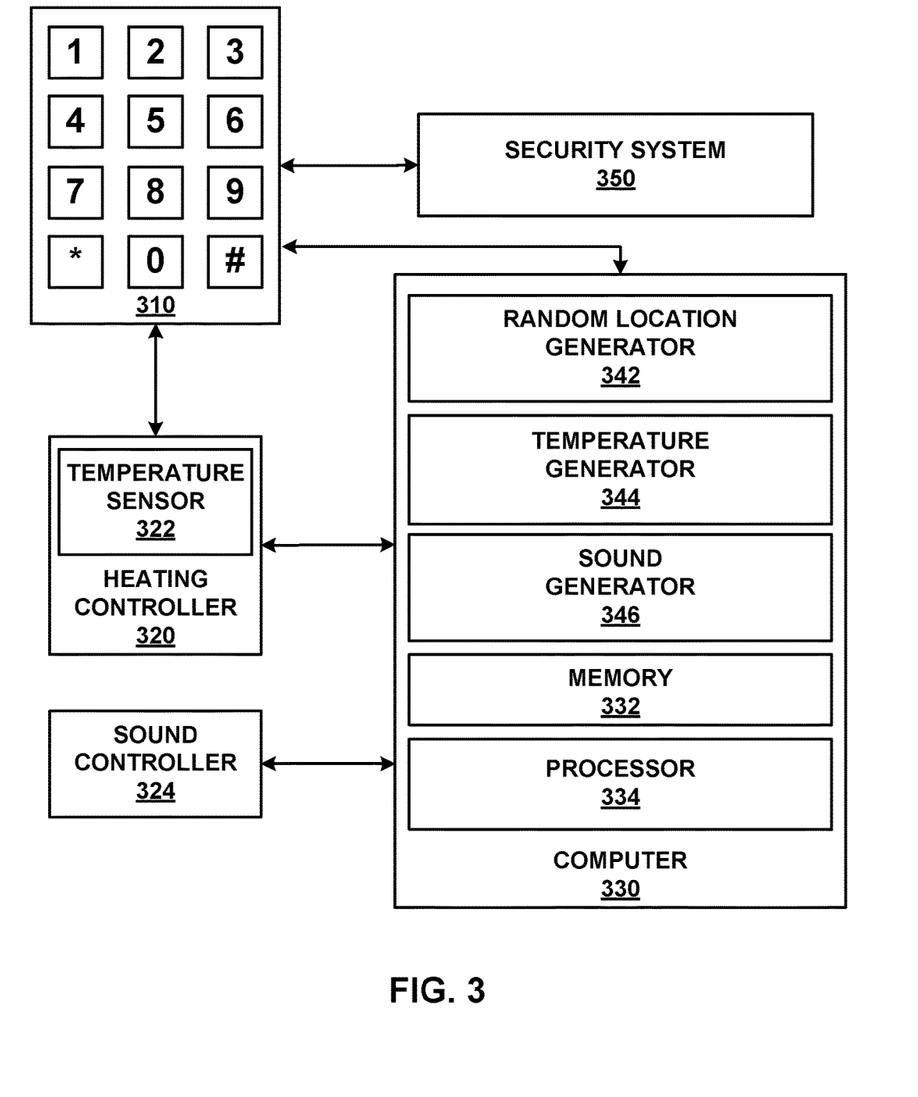
FIG. 3 depicts an illustration of a computer configured to create random interjections of noise of heat and sound, according to embodiments.

FIG. 3, a computer configured to create random interjections or noise to obfuscate a security code theft of an authorized user is illustrated, according to embodiments. The random interjections or noise may include thermal noise or audible noise in an attempt to obfuscate an unauthorized user from using a security code of an authorized user. The thermal noise may be generated by a heating controller 320 and the audible noise (audible tone) may be generated by a sound controller 324. The security device 310 may receive the input from the user in the form of a security code, which may be authenticated by a security system 350. The security system 350 may allow or deny the user access based on the inputted security code.

In various embodiments, the heating controller 320 may include a temperature sensor 322. The temperature sensor 322 may monitor the temperature of the security device 310. The temperature sensor 322 may measure the temperature of the inputs of the security device 310 and send the recorded temperature to the computer 330. The computer may use the recorded temperature of the security device 310 to determine a temperature range for heating the inputs when using the temperature generator 344. The temperature sensor may also record the temperature of the input of a user on the security device 310. The computer may use the recorded temperature of the user when using the temperature generator 344. For example, a user may press an input of the security device 310 and the temperature sensor 322 may measure the temperature of the input of the user. The computer 330 may then use the measured temperature to determine a temperature for the temperature generator 344.

The security system 350 may be local or a network security system. A local security system may allow the user to access an area or storage. Examples of a local security system may include a safe, a door entry, or accessing a device. For example, a door entry may include a locked door that may be unlocked if the user is able to input a security code. If the user is in possession of the security code, then the user may input the security code into the security device 310 and unlock the door. In an additional example, an accessing of a device may include a mobile device. The mobile device may require a security code to be able to access the device. The user may input the security code into the mobile device, and if the security code is correct, then the user may access the device. A network security system may include access to a room within a building or a shared storage. The security system 350 may be connected to a network that may store security codes for one or more authorized users. The security codes may be stored within a database. If a user inputs a security code, then the security code may be checked within the database and the user may be allowed or denied access based on the input of the security code.

To keep the security code from being gathered by an unauthorized user a computer 330 may create thermal noise or audible noise. The thermal noise may be generated and transmitted to the security device from a heating controller 320. The audible noise may be generated through a sound generator 346 and outputted through a sound controller 324. The thermal noise may include heating the inputs or behind the inputs of the security device 310 to obfuscate an attempt of an unauthorized user from gathering and using the security code of an authorized user. The heating may include increasing the temperature of the area around the input to create thermal noise when monitoring the security device 310 with a thermal imaging device. The audible noise may create an audible sound or an audible tone (e.g. a beep) that may mask the sounds of a button press of a user when inputting a security key. The thermal noise or the audible noise may be generated to obfuscate an unauthorized user from determining a pattern.

A computer 330 may contain a memory 332 that is communicatively coupled to a processor 334. The memory 332 may store one or more functions that the processor 334 may perform. The functions may include a random location generator 342, a temperature generator 344, and a sound generator 346. The functions may be include a random number generator that determines the how the functions perform. For example, the random number generator may send the random location generator 342 the locations one or more inputs to heat on a first input of a user and each subsequent input of the user. In an additional example, the random number generator may inform the temperature generator 344 various temperatures to heat each of the inputs determined by the random location generator 342. In an additional example, the sound generator 346 may output a sound bite or file that may cause the sound controller 324 to output a sound.

The random selection of heating elements by the heating controller 320 may include a random number generator that operates a random location generator 342. The random location generator 342 may randomly select one or more heating elements to be heated. The random number generator may also randomly select temperatures through the temperature generator 344 to heat the inputs that were randomly selected to a temperature. Upon an input of user on an input of the security device 312 the computer 330 may select one or more inputs to be heated, and temperatures for the inputs to be heated to. For example, a 10-digit input device may be used by the security system including inputs numbered from 0-9. An input of the user pressing the first input may cause the random location generator 342 to select the sixth input and the ninth key. The temperature generator 344 may then select a temperature for the randomly selected sixth input and ninth input to be heated to. The computer 330 may then output the selections to the heating controller 320. The heating controller 320 may then output the heating instructions to the sixth heating element and the ninth heating element of the input device 312.

In various embodiments, a lower threshold and an upper threshold of the temperature may be placed on the temperature generator. The lower threshold and the upper threshold may prevent the temperature generator 344 from using an in inefficient or excessive temperature. An inefficient temperature may include heating the input to a temperature that is lower than the temperature of the environment of the input device, which may not register on a heat map when monitored. To prevent an inefficient temperature from being used a lower threshold may be imposed on the temperature generator 344. The lower threshold of the temperature may be determined by measuring the ambient temperature of the security device. A temperature sensor 322 may monitor the temperature of the inputs of the input device. Without any input from a user, the temperature may be recorded of the ambient temperature. The ambient temperature may be used as the lower threshold. For example, the ambient temperature of the security device may be 20° C. The lower threshold may then be set at 20° C. An excessive temperature may include heating the input to a temperature that is greater than the temperature of an input of a user, which may be too excessive on a heat map when monitored. An excessive temperature may also be determined by a temperature barrier which may be placed on the input device to prevent the temperature of the input to be too hot for a user to touch, or too hot to register as an input on a heat map when monitored. To prevent an excessive temperature from being used an upper threshold may be imposed on the temperature generator 344. The upper threshold may be determined by the lower threshold, the temperature of an input of the user, or of a temperature barrier. Upon the determination of the lower threshold, the upper threshold may be determined by the lower threshold. For example, if the lower threshold is 20° C. the upper threshold may be set 15° C. higher at 35° C. The upper threshold may be determined by the user. For example, the user may press a key. Upon the keypress of the user, the temperature of the input may be recorded and used as the upper threshold of the temperature. A temperature barrier may be set to prevent the input device from getting too warm for use. A temperature barrier may be set at a comfortable temperature that the user may still touch without having to worry about being painful. For example, a comfortable temperature to touch may be 35° C., if the input device is more than 35° C. the input device may be too hot to touch. The temperature barrier may then be set at 35° C.

The sound generator 346 may generate a sound on each input of the user. Upon the input of a security code of a user the sound generator 346 may access a sound or tone database stored within the sound generator 346 and the sound may be outputted to the sound controller 324. The speaker may then output the sounds or tone to muffle or mask the keypress of the user. For example, the input of a user may cause the sound generator 346 to send the instructions to the sound controller 324 for an audible beeping sound to be produced for each input. The audible beeping sound may be the same beeping sound for each keypress. In an additional example, each keypress of the user may cause a different sound or tone may be selected at random and outputted by the sound controller 324. The first input may cause a high tone, a second input to be a low tone, the third and fourth inputs may cause a high tone, and the fifth input a low tone. Each input from every user inputting on the security device 310 may cause a different combination of high and low tones.

Figure 4:
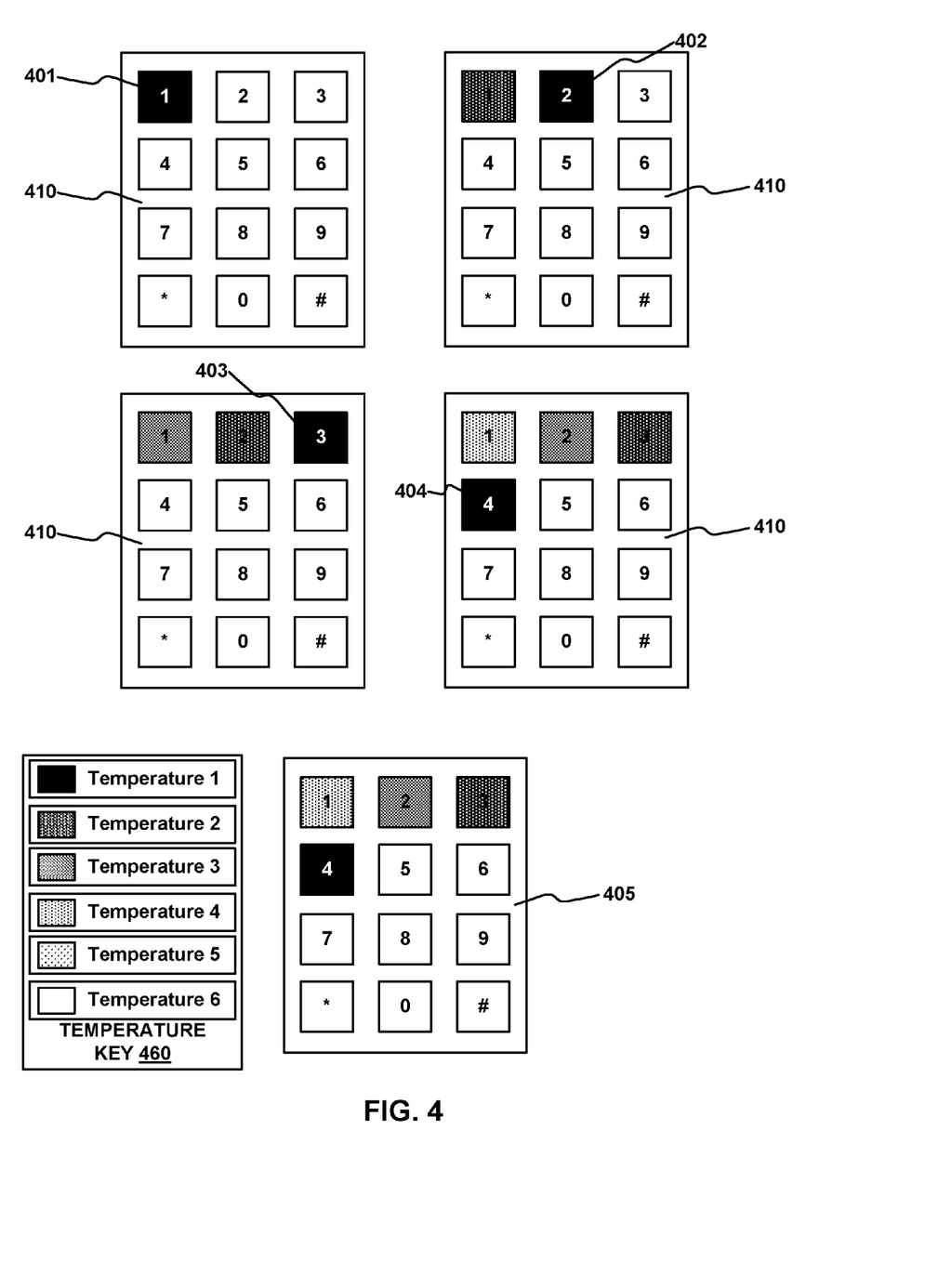
FIG. 4 depicts an illustration of a user entering a security code on an input device, according to various embodiments.

FIG. 4, a user entering a security code on an input device is illustrated, according to embodiments. A user may input a four-digit security code including four button presses on the input device 410. The four-digit security code may include a first input 401, a second input 402, a third input 403, and a fourth input 404. The four-digit security code may result in a successful security code input of 405. Each input of the four-digit security code may include the user heating the inputs by heat transfer. Heat transfer may include conduction where one object is heated by another. Each input of the user may heat the input through conductive heat transfer. For example, if a user presses the one input with the first input 401, then the first key may be heated by conduction.

The temperature key 460 displays a temperature gradient. The temperature key 460 contains six temperatures 1-6 from black (temperature 1) being the hottest, to white (temperature 6) being unheated which may be at a start (ambient) temperature. The ambient temperature may include heating due to the environment of the input device 410. For example, the input device may be heated by thermal radiation from the sun. The input device may start at an ambient temperature of the environment, and be heated from the input of the user.

In various embodiments, a temperature gradient may be selected for the temperature key 460. The temperature key 460 range may include temperatures ranging from a lower threshold to an upper threshold. The temperatures between the lower threshold and the upper threshold may be set temperatures between the upper threshold and the lower threshold. The lower threshold may be set for temperature 6, the lowest temperature. For example, the lower threshold may be set at the ambient temperature of the input device 410. If the ambient temperature of the input device 410 is 20° C. then the temperature 6 may be set at 20° C. The upper threshold may be set for temperature 1, the highest temperature. For example, the upper threshold may be set based on a temperature 10° C. above the lower threshold making temperature 1 a temperature 30° C. The range of temperatures between temperature 1 and temperature 6 for the temperature key 460 may be 20° C. for temperature 6, 22° C. for temperature 5, 24° C. for temperature 4, 26° C. to temperature 3, 28° C. for temperature 2, and 30° C. for temperature 1. In an additional example, the upper threshold may be set from the first input 401 of the user on an input of the input device 410. If the temperature of the input of the user is 30° C., then the upper threshold or temperature 1 may be set at 30° C. The range of temperatures between temperature 1 and temperature 6 for the temperature key 460 may be 20° C. for temperature 6, 22° C. for temperature 5, 24° C. for temperature 4, 26° C. to temperature 3, 28° C. for temperature 2, and 30° C. for temperature 1.

The user may input the security code by pressing the inputs of the input device 410. If the security code is a four-digit combination of inputs 1-2-3-4, the user may input a first input 401, a second input 402, a third input 403, and a fourth input 404. The user may transfer heat to the inputs of the input device 410 and after inputting the security code, and a thermal imaging device may gather the heat map 405 of the input device. The heat map 405 may display a residual heat left by the user based on conduction of the user inputting the input presses of the security code.

For an unauthorized user to determine the security code, the unauthorized user may use the heat map to determine which input is the hottest and which is the coolest of the four-digit security code. The hottest key, the fourth input of a temperature 1 would be the last input the user pressed making it the fourth input. The second hottest key, the third input of a temperature 2 would be the second to last input the user pressed making the third input. The third hottest key, the second input of a temperature 3 would be the second input the user pressed making it the second input. The fourth hottest key, the third input of a temperature 4 would be the first input the user pressed making the first input. The unauthorized user would then determine that the four-digit security code would be 1-2-3-4.

In various embodiments, during the security code input of the user a sound may be outputted during the input of the user. The input device may output a sound or tone on the input of the user or the sound made by the pressing of the input may be monitored by the unauthorized user. If each input made a different audible tone, then the unauthorized user may listen to the input of the security code of the user and copy the security code. For example, the first input 401 may output a first tone, the second input 402 may output a second tone, the third input 403 may output a third tone, and the fourth input 404 may output a fourth tone. If the unauthorized user listened to all of the inputs, then the unauthorized user may determine that the security code is 1-2-3-4.

Figure 5:
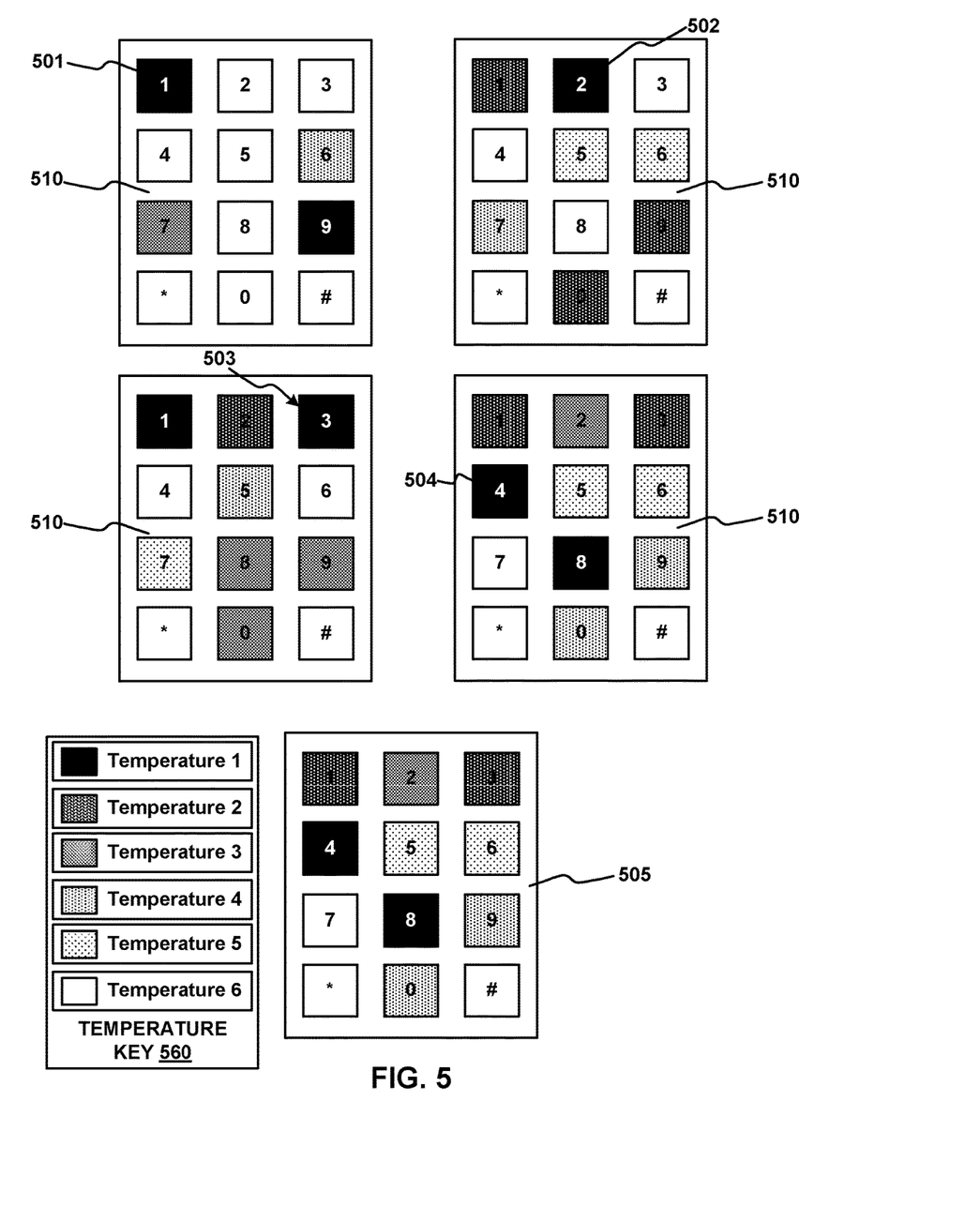
FIG. 5 depicts an illustration of a user entering a security code on an input device while the computer interjects thermal and audible noise, according to various embodiments.

FIG. 5, a user enters a security code on an input device while the computer interjects noise to obfuscate a theft of an identity of a user is illustrated, according to embodiments. An authorized user may input a security code on an input device 510 and a computer may instruct a heating element to heat individual inputs of the input device 510 to obfuscate a thermal imaging device from gathering the security code of the user. The computer may randomly select one or more inputs to be heated. The computer may heat the randomly selected inputs to varying temperatures. The temperatures may include the temperatures within the temperature key 560. The temperature key 560 may include the temperatures of heated inputs from temperatures 1-6, where temperature 1 is the hottest, and temperature 6 is an initial temperature.

In various embodiments, a temperature 6 of the temperature key 560 may be the temperature of the input device 510 at ambient temperature of the environment of the input device 510. Heating the input device 510 by the user may increase the temperature of the pressed inputs, based on heat exchange from the user to the input though conduction.

In various embodiments, a temperature 1 of the temperature key 560 may include using a temperature sensor to record the temperature of the input of the user. The temperature sensor may record the temperature of the user, and set the temperature 1 of the temperature key 560 at that temperature for the random heating of the input device. For example, the user may make the first input 501. The temperature sensor may record temperature of the first input 501 of 34° C. The computer may use the recorded temperature of 34° C. as the temperature 1 for a temperature selection.

The security input of the authorized user inputting the security code on the input device 510 may include heating a plurality of inputs that are selected. The selection may include a computer with a random number location. The random location generator may select the plurality of heating elements to be heated. The heating of the plurality of heating elements may cause the inputs to be heated or look to be heated. The computer may also include a temperature selector. The computer may include a random generator for determining a temperature to heat the randomly selected inputs. For example, the authorized user may input a security code of 1-2-3-4. The random thermal noise outputted by the computer may display multiple possible four-digit security code combinations that may obfuscate an attempt of an unauthorized user for accessing the security code of the authorized user.

In various embodiments, the plurality of inputs may be selected in a sequence or an order. The sequence or order may include a cycle of selected heating elements by the computer. The sequence may include a predetermined list that the computer may use to determine the next set of heating elements to be heated. The sequence may be selected regardless of the input of the user. The list may include an every combination of heating elements and temperature the heating elements may be heated to theoretically creating an infinite list of the sequence. For example, the list may include a sequence of one-hundred thousand combinations of heating elements and temperatures. The first sequence may be selecting heating element one and five with temperatures 31° C. and 32° C. respectively. The second sequence may be selecting heating element two and nine with temperatures 35.004° C. and 37.05° C. respectively. The sequences may continue until the final combination is reached and restarted at the beginning.

In various embodiments, the cooling of the input may be measured to determine the appearance of the temperature of the input at various intervals after the input. The cooling of an input may include measuring the temperature of the pressing of the input by the user. The decrease of the temperature may be measured at time intervals that the computer determines for a security code entry. For example, a typical security code entry may take 4 seconds for a 4-digit security code 1 second per entry. If in 1 second the temperature of a pressed entry decreases from 34° C. to 33° C., then the cooling may be 1° C. per second. Therefore, every 1° C. change in temperature may appear to be a 1 second previous input on the heat map of the thermal imaging device.

The first input 501 may include a user inputting a first number of a four-digit security code. The first input may include a random selection by the computer of a plurality of random inputs to be heated, and a temperature to heat each of the plurality of inputs. For example, the first input 501 may include the user pressing the first (1) key. Upon pressing the first key, a plurality of inputs may be heated including the sixth (6), seventh (7), and ninth (9) inputs. The first input may be heated from the user to temperature 1, the sixth input may be heated from the computer to temperature 4, the seventh input may be heated to temperature 3, and the ninth input may be heated to temperature 1.

The second input 502 may include a user inputting a second number of a four-digit security code. The second input may include a random selection by the computer of a plurality of random inputs to be heated, and a temperature to heat each of the plurality of inputs. The second input may also include the cooling of inputs previously heated from the first input 501. For example, the second input 502 may include the user pressing the second (2) key. Upon pressing the second key, a plurality of inputs may be heated including the zero (0), and fifth (5) key. The second input may be heated from the user to temperature 1, the zero input may be heated from the computer to temperature 2, and the fifth input may be to temperature 5. The inputs from the first input 501 may also retain their heat or an amount of the heat from the first random heating. The retention of the heat may cause the first input to have a temperature 2, the sixth input to have a temperature 5, the seventh input to have a temperature 4, and the ninth input to have a temperature 2.

The third input 503 may include a user inputting a third number of a four-digit security code. The third input may include a random selection by the computer of a plurality of random inputs to be heated, and a temperature to heat each of the plurality of inputs. The third input may also include the cooling of inputs previously heated from the first input 501 and the second input 502. For example, the third input 503 may include the user pressing the third (3) key. Upon pressing the third key, a plurality of inputs may be heated including the first (1), the fifth (5), and the eighth (8) inputs. The third input may be heated from the user to temperature 1, the first input may be heated from the computer to temperature 1, the fifth input may be heated to temperature 3, and the zero input may be heated to temperature 3. The inputs from the first input 501 and the second input 502 may also retain their heat or an amount of the heat from the first random heating. The retention of the heat from the first input 501 may cause the sixth input to have a temperature 6, the seventh input to have a temperature 5, and the ninth input to have a temperature 3. The retention of the heat from the second input 502 may cause the zero input to have a temperature 3, and the second input to have a temperature 2.

The fourth input 504 may include a user inputting a fourth number of a four-digit security code. The fourth input may include a random selection by the computer of a plurality of random inputs to be heated, and a temperature to heat each of the plurality of inputs. The fourth input may also include the cooling of inputs previously heated from the first input 501, the second input 502, and the third input 503. For example, the fourth input 504 may include the user pressing the fourth (4) key. Upon pressing the fourth key, a plurality of inputs may be heated including the sixth (6), and the eighth (8) inputs. The fourth input may be heated from the user to temperature 1, the sixth input may be heated from the computer to temperature 5, and the eighth input may be heated to temperature 1. The inputs from the first input 501, the second input 502, and the third input 503 may also retain their heat or an amount of the heat from the first random heating. The retention of the heat from the first input 501 may cause the seventh input to have a temperature 6, and the ninth input to have a temperature 4. The retention of the heat from the second input 502 may cause the zero input to have a temperature 4, and the second input to have a temperature 3. The retention of the heat from the third input 503 may cause the first input to have a temperature 2, the third input to have a temperature 2, and the fifth input to have a temperature 5.

The heat map 505 of the input device may display the input of the user input of the security code and the random heating of the input device by the computer. The heat map 505 may include the residual heat of the inputs of the input device from the heating of the inputs from the user through a heat transfer of conduction, and the random heating by the computer through a heat transfer. The example heat map 505 may include a first input of temperature 2, a second input of temperature 3, a third input of temperature 2, a fourth input of temperature 1, a fifth input of temperature 5, a sixth input of temperature 5, a seventh input of temperature 6, an eighth input of temperature 1, a ninth input of temperature 4, and a zero input of temperature 4. Using the heat map 505, the security code may difficult to determine a four-digit input from the heat map 505. For example, the security code could be interpreted as 5, 6, 9, or 0 as the first input, 2 as the second input, 1 or 3 as the third input, and 4 or 8 as a fourth input. In an additional example, the security code could be interpreted as 5 or 6 as the first input, 2, 9, or 0 as the second input, 1 or 3 as the third input, and 4 or 8 as the fourth input.

In various embodiments, the input device may be a touch screen. The touch screen may include a GUI. The GUI may display a plurality of inputs to the user, which the use may press to input a security code. The user may select one or more inputs on the touch screen to input the security code. For example, the touch screen device may be a mobile phone. The mobile phone may display number 0-9 that the user may input for the security code. The user may then input the security code by pressing one or more portions of the mobile phone to input the security code.

In various embodiments, after the user inputs the security code a plurality of randomly selected inputs may be heated to a temperature. Instead of heating a plurality of inputs after each input press, the heating of the plurality of inputs may be initialized after the fourth digit of the four-digit security code has been inputted. Upon the press of the first through third input the input device may not be heated, upon the press of the fourth key, a plurality of inputs of the input device 510 may be heated. For example, after the fourth input may include selecting a random plurality of inputs to heat to a temperature. After the fourth input the heating of the inputs may be displayed on a heat map 505 of the temperature of the inputs.

In various embodiments, the timing of the heating of the heating elements by the heating controller, or the output of the sound by the sound controller may be delayed. The delay of the timing of the heating elements may obfuscate the heat map generated by a thermal imaging device. When observed on a thermal imaging device the delayed input may look as an additional input has been pressed. For example, a user may press a first input and 0.5 seconds after the first input was pressed the fourth input is heated, the fourth input when observed on a heat map would seem to look like the fourth input was pressed in secession after the first input. When the sound of the sound controller is delayed, the delayed sound output may seem to sound like an additional input was pressed or multiple additional inputs were pressed. For example, a user may press a first input, which results in an audible sound, 0.5 seconds after the user presses the first input a sound may be generated and outputted from the sound controller, which may sound like a second input being pressed.

Figure 6:
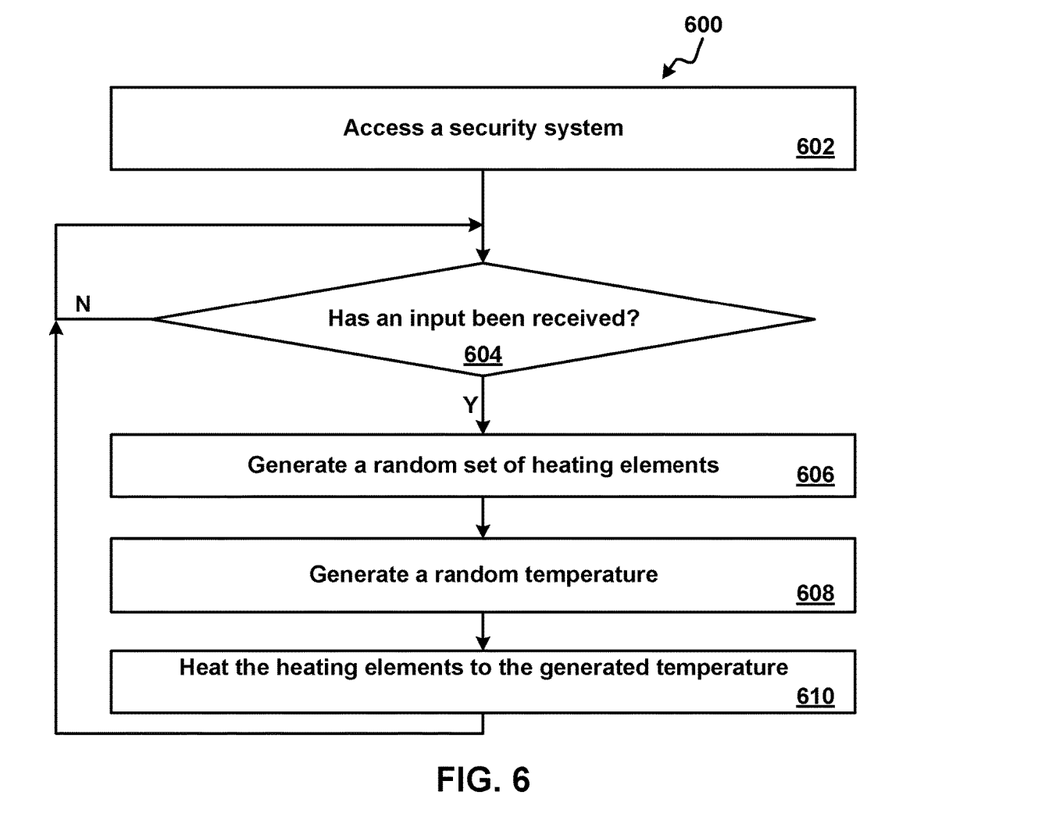
FIG. 6 depicts a flowchart of the random security measure being interjected, according to various embodiments.

FIG. 6, a flowchart of a method 600 of the random heating security measure being interjected is illustrated, according to embodiments. A security system may include a computer configured to randomly heat inputs of the input device. The computer may also be configured to randomly heat the randomly selected inputs of the input device to a selected temperature. Monitoring the input device with a thermal imaging device after heating the inputs randomly may display a plurality of inputs heated to various temperatures. The computer may also be configured to create random audible noise.

In operation 602, a security system may include a security device (input device) that a user may input one or more inputs to gain access to what the input device is securing. The input device may be used to input a security code. The security system may include an input device is coupled to a heating controller. The input device may include a plurality of inputs a user may press to input a security code. The heating controller may connect to heating elements within the input device. The heating elements may be within the inputs of the input device, behind the inputs of the input device, or may heat the inputs of the input device. The heating controller may also be communicatively coupled to a computer that may instruct the heating controller to heat the heating elements of the input device. The computer may determine a random plurality of inputs (set of inputs) that may be heated. The computer may determine a temperature to heat each of the set of inputs. The input device may then be heated to a temperature determined by the computer.

In operation 604, the computer determines if an input has been received on the input device. The computer may implement a security measure based on the input of a user. The input of the user may include a press of an input or button of the input device. The user may press an input of the input device when inputting a security code. The computer may then implement a security measure upon the input of the user. The security measure may include heating a plurality of inputs of the input device. The heating of the plurality of heating elements may obfuscate a use of heat map of a thermal imaging device from gathering the security input of an authorized user. For example, a user may press an input of the input device, upon the press of the input device a security measure may be implemented by the computer and heating controller on the input device. If an input of the input device is not pressed the method 600 may loop or be suspended until an input is pressed. If an input of the input device is pressed the method 600 may progress to operation 608, where a set of heating elements are generated.

In various embodiments, a security measure may include generating a random tone based on the input of the user. The generation of an audible tone may obfuscate the sounds generated by the input of the authorized user on the input device. The computer may be communicatively coupled with a speaker. The speaker may generate a tone on the press of the input by the user. For example, a user may press a first key of the input device. The computer may then output a tone to the speaker that is audibly transmitted by the speaker obfuscating the sound of the input press by the user.

In operation 606, a random set of a plurality of heating elements are generated. The input may issue a command to the computer, which may determine a random plurality of inputs (a random set of inputs) to be heated. The randomly selected set of the plurality of inputs to be heated may be routed through the heating controller, which informs the randomly selected set of heating elements to heat. For example, the user may press an input of the input device when entering the security code. Upon the press of the key, the computer may determine that a random set of two inputs of the input device may be heated. In an additional example, upon the press of an input of the user, the computer may determine that a set of three inputs of the input device may be heated.

The security measure may include audible noise. Upon the input of the user, a random audible noise may be generated to obfuscate the sound of the input of the user that an unauthorized user may use to determining the input of the authorized user by listening. For example, if an authorized user presses an input of the input device, a speaker may output an audible tone to the user. The audible tone may mask the sound the input produces when inputted by the user.

In operation 608, a temperature is generated for each heating element of the set of the plurality of heating elements. A command may be generated by the computer to determine a temperature of which to heat the set of inputs. The command may include one or more temperatures that the heating elements may be heated to. The command may be sent from the computer to the heating controller, instructing the heating controller to heat the heating elements to a randomly selected temperature. The randomly selected temperature may be generated from a temperature range including a lower threshold and an upper threshold. The lower threshold may be set based on an ambient temperature. For example, the lower threshold may be set by measuring the temperature of the input device, the temperature of the input device before the input of the user may be set as a lower threshold. The upper threshold may be set based on the lower threshold or an upper limit of the temperature.

The heating controller may instruct the heating elements to heat to the selected temperature. For example, a press of a third input of the input device may generate a set of two heating elements including a first heating element and a fifth heating element. A temperature is selected by the computer for the first heating element of a temperature of 34° C. and a temperature is selected for the fifth heating element of a temperature of 38° C. In an additional example, a press of a ninth input of the input device may generate a set of four heating elements including a first, second, sixth, and eighth heating elements. A temperature may be generated by the computer for each of the inputs in the set resulting in 32° C. for the first, 35° C. for the second, 35° C. for the sixth, and 37° C. for the eighth.

In various embodiments, the temperature can be randomly selected by the computer. The temperature may be randomly selected between the upper and lower threshold. Instead of determining the temperature of the inputs, the temperature may just be randomly selected by a random number generator within the computer as long as the temperature is between the upper threshold and the lower threshold. For example, if the upper threshold is 40° C. and the lower threshold is 30° C. then a temperature may be selected between 30-40° C.

In various embodiments, the temperature controller may include a temperature sensor. The temperature sensor may measure the temperature of the input after a user presses the input. Upon the pressing of the input by the user, the temperature sensor may record the temperature of the input pressed by the user. The recorded temperature may then be used by the computer for the temperature generator. For example, the user may press the first input of the security device. The temperature sensor may then record the temperature of the first input as 36° C. The temperature measurement by the temperature sensor of 36° C. may then be applied to one or more inputs of the security device as a security measure.

In various embodiments, the temperature may be selected based on a determined cooling of the input. The rate of cooling may be measured and applied to the determination of the temperatures. By selecting the temperatures based on the rate of cooling, the heat map of the input device may look like inputs were pressed in different time periods. For example, if the cooling rate of an input is 1° C. per 1 sec, then every 1° C. difference in the temperature of the input causes the cooler input to seem to be inputted 1 sec earlier.

In operation 610, the temperature is applied to the set of the plurality of heating elements. The random set of heating elements and the selected temperatures for each of the heating elements within the set may be generated by the computer and sent the heating controller. The heating controller may then heat the set of heating elements to their respective temperatures. For example, a set of heating elements may include a first heating element and a third heating element. The computer may determine a temperature of 34° C. for the first heating element and 36° C. for the third heating element. The first heating element may then be heated to 34° C. and the second heating element may be heated to 36° C. In an additional example, a set of heating elements may include a second heating element a fifth heating element and a seventh heating element. The computer may determine a temperature of 31° C. for the second heating element 34° C. for the fifth heating element and 34° C. for the seventh heating element. The second heating element may then be heated to 31° C. the fifth heating element may be heated to 34° C. and the seventh heating element may be heated to 34° C.

The method 600 may then return to operation 604 where additional inputs are received by the input device, which may result in additional sets of heating elements being randomly selected and heated to temperatures. For example, the user may input a first input on the third key that randomly heats the fourth key to 36° C. and the fifth key to 32° C. The user may then input a second input on the eighth key that randomly heats the third key to 34° C., and the seventh key to 35° C. The method may continue indefinitely until the user ceases inputting keys on the input device.

In various embodiments, the heating controller may receive the heating instructions on the completion of the input of the security code of the user. Upon the completion of the inputs of the user on the security device, the heating controller may heat a random set of keys generated by a computer. A security code may require a predetermined amount of inputs, after the predetermined amount of inputs have been pressed, the computer may instruct the heating controller to heat a generated random set of heating element to a randomly generated temperature for each heating element. For example, the security code may a predetermined amount of inputs of four inputs, upon the fourth input press of the user; the computer may send a generated random set of heating elements and temperatures to the heating controller and heat the generated random set to the temperatures.

In various embodiments, the security measure may include audible noise. Upon the input of the user, a random audible noise may be generated to obfuscate the sound of the input of the user that an unauthorized user may use to determining the input of the authorized user by listening. For example, if an authorized user presses an input of the input device, a speaker may output an audible tone to the user. The audible tone may mask the sound the input produces when inputted by the user.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for obfuscating a security code, the system comprising:
    an input device including a plurality of heating elements, wherein the input device is configured to:
    receive an input from a user on the input device that grants access to a user based on an entry of a security code, the input device coupled to a plurality of heating elements;
    a memory;
    a processor device communicatively coupled to the input device and the memory, wherein the processor device is configured to:
        measure an ambient temperature of an input device;
        display the input device on a graphical user interface;
        communicate, in response to receiving the input, a random audible tone to the user;
        record a temperature of the input of the user on the input device;
        generate, in response to receiving the input, a random set of heating elements including one or more heating elements of the plurality of heating elements;
        determine a temperature of a temperature range for heating one or more heating elements of the random set of heating elements based on the temperature of the input of the user, wherein the temperature range includes:
            an upper threshold of the temperature range which is the temperature of the input of the user, and
            a lower threshold of the temperature range which is the ambient temperature of the input device; and
    a heating controller communicatively coupled to the input device, the memory, and the processor device, wherein the heating controller is configured to:
        apply the temperature of the temperature range to each of the one or more heating elements of the random set of heating elements.

* * * * *